Figure 4:
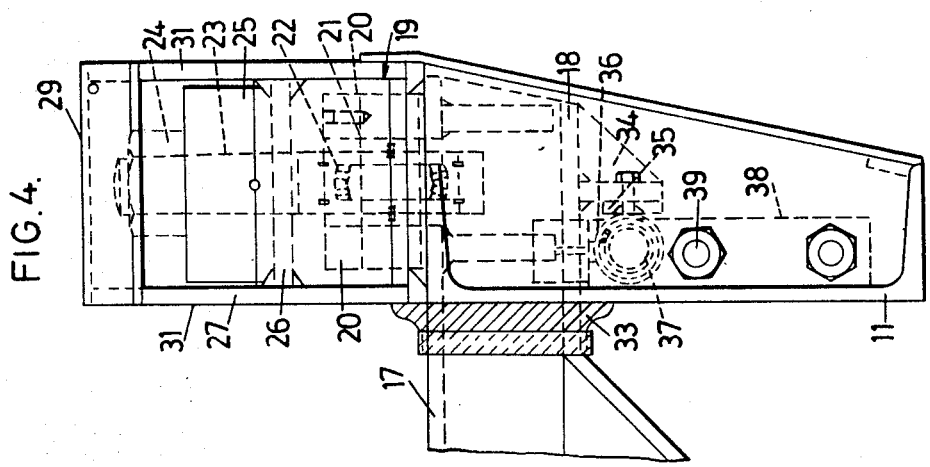

United States Patent [19]
May et al.

[11] 3,974,889
[45] Aug. 17, 1976

[54] AXLE WEIGHING OF ROAD VEHICLES

[75] Inventors: Frank Herbert May, London;
William Wilfred Marshall,
Worcester, both of England

[73] Assignee: Saunders Transport Limited,
London, England

[22] Filed: Oct. 17, 1974

[21] Appl. No.: 515,460

[30] Foreign Application Priority Data
Nov. 2, 1973 United Kingdom............... 51081/73

[52] U.S. Cl................................ 177/134; 177/45;
177/245; 177/DIG. 9; 15/DIG. 2
[51] Int. Cl.²................... G01G 19/02; G01G 23/18
[58] Field of Search............. 177/134, 135, 245, 45,
177/165, DIG. 9; 15/DIG. 2

[56] References Cited
UNITED STATES PATENTS

| | | | |
|---|---|---|---|
| 2,523,413 | 9/1950 | Bohannan....................... | 177/134 X |
| 2,746,738 | 5/1956 | Reiser............................. | 177/45 X |
| 2,869,853 | 1/1959 | Pratt................................ | 177/165 |
| 3,082,834 | 3/1963 | Ellis................................. | 177/134 |
| 3,797,593 | 3/1974 | Conley............................ | 177/134 |
| 3,871,491 | 3/1975 | Yamanaka et al.............. | 177/134 X |

FOREIGN PATENTS OR APPLICATIONS
1,270,251   4/1972   United Kingdom............. 15/DIG. 2

*Primary Examiner*—George H. Miller, Jr.
*Attorney, Agent, or Firm*—Rose & Edell

[57] ABSTRACT

In a wheel cleaner for the cleaning of truck wheels solely by centrifugal action, a weigh beam is incorporated whereby the individual axle loadings and the total weight of the truck can be determined. At the center of a wheel cleaner frame that is set into the ground, pairs of transverse horizontal rollers are provided on which the truck wheels can be spun to throw off mud, stones etc. At the end of the frame a transverse weigh beam, having its top surface substantially at the same level as the tops of the rollers and the frame members, is carried for limited downward travel on end suspension mountings each incorporating a load cell. The load cells give analogue electrical signals that are converted to digital form and processed to derive individual axle loadings and vehicle payload.

8 Claims, 5 Drawing Figures

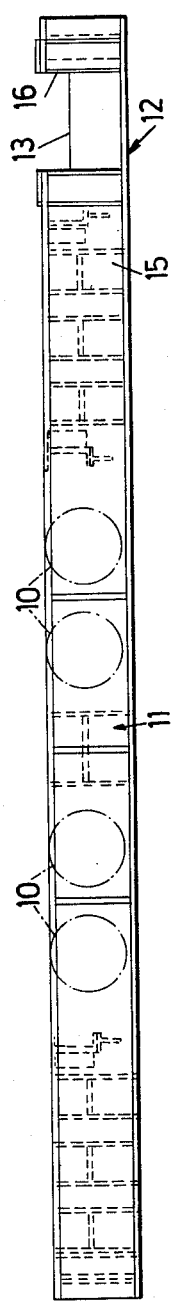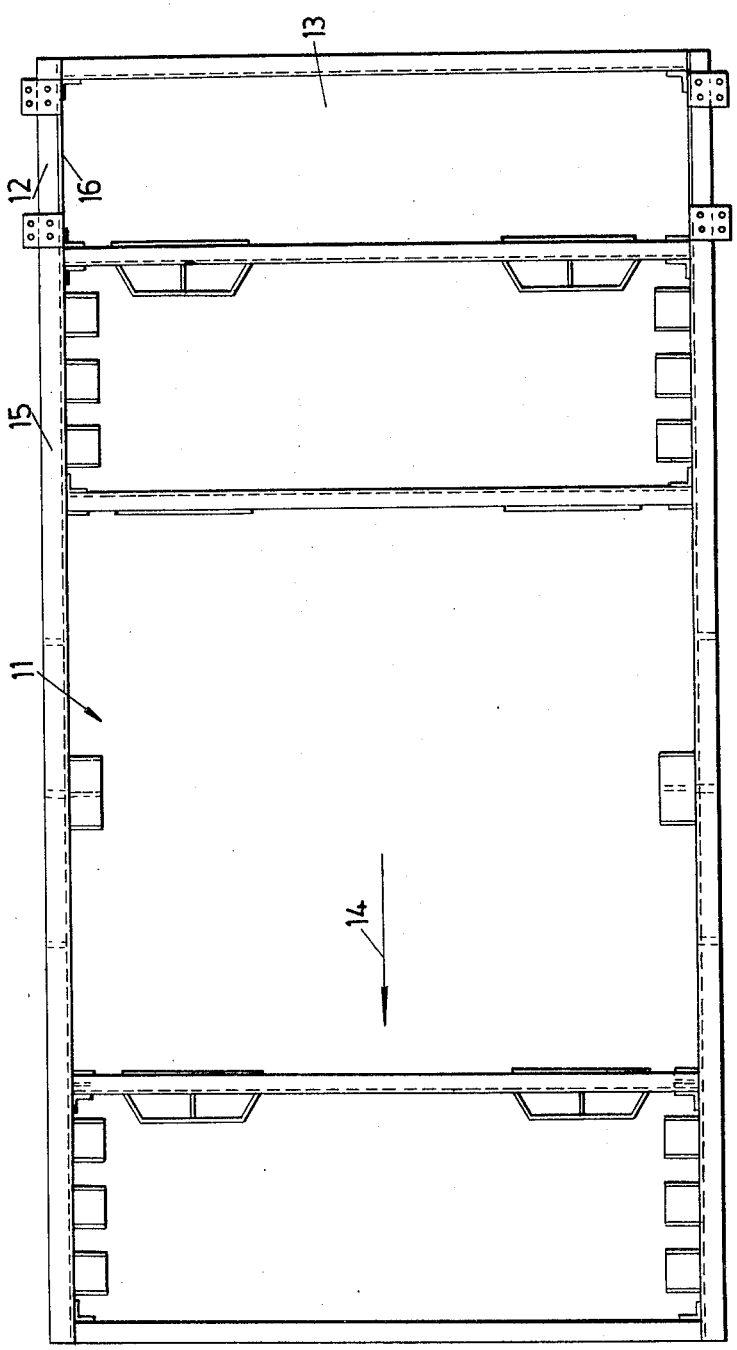
FIG.1.
FIG.2.

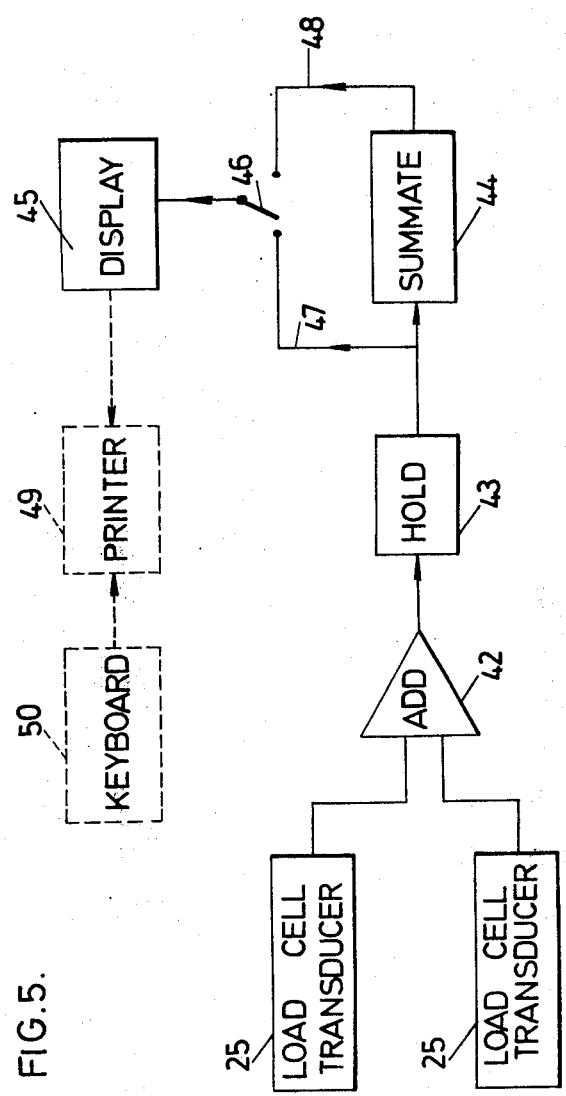

AXLE WEIGHING OF ROAD VEHICLES

This invention relates to the axle weighing of road vehicles. More particularly, it is concerned with contractors' trucks moving on and off building sites.

The overloading of goods vehicles is a considerable problem and there are penalties for haulage operators who transgress. It is possible that further legislation will be introduced making building contractors and others actually involved in the loading of vehicles also legally responsible. But at present the haulage operator accepting a contract for removing excavated material from a building site is normally required by the building contractor to take away material at a price per cubic yard whereas the haulage operator himself has a legal obligation to monitor the weight of the material trucked in order to ensure that his vehicles are not overloaded. It is an object of this invention to provide equipment that will enable such operations to be carried on as economically as possible without going beyond the limits imposed by law.

The cost of constructing and installing a conventional weightbridge at a building site is uneconomic because of the relatively short life of most contracts. However, according to the present invention the problem is overcome by means of a wheel cleaner that incorporates a weigh beam. Another legal requirement that has to be met bars trucks from moving on to the public road system with mud or the like on their wheels. It is therefore increasingly common practice for building sites to have a wheel cleaner installed, such as that described in our U.S. Pat. No. 1,270,251 and this invention provides for the embodiment in such a wheel cleaner of a weight beam whereby truck axle weights can conveniently be checked as each vehicle is passing over the wheel cleaner in preparation for departure from the site.

Preferably, one or more electrical or electronic transducers, e.g. strain gauges, are employed to act as load cells, so that the signal output indicating the instantaneous weight on the weigh beam is either electrical analogue or electrical digital in form. The advantage of this is that electrical analogue or digital signals can be very readily stored and summed so that not only can the weight on each axle of a truck be checked to ensure that the maximum pemissible loading is not being exceeded but also, by appropriately summing the individual axle weight signals, one may obtain a measure of the total truck weight, and hence the total load carried, which can then be recorded.

This is important to the contractor because payments are commonly made according to the weight of material conveyed and, especially in the case of removal from a site of excavated spoil, there is currently often no record of the amount of the load carried by each individual truck except the driver's estimate.

Figure 3:
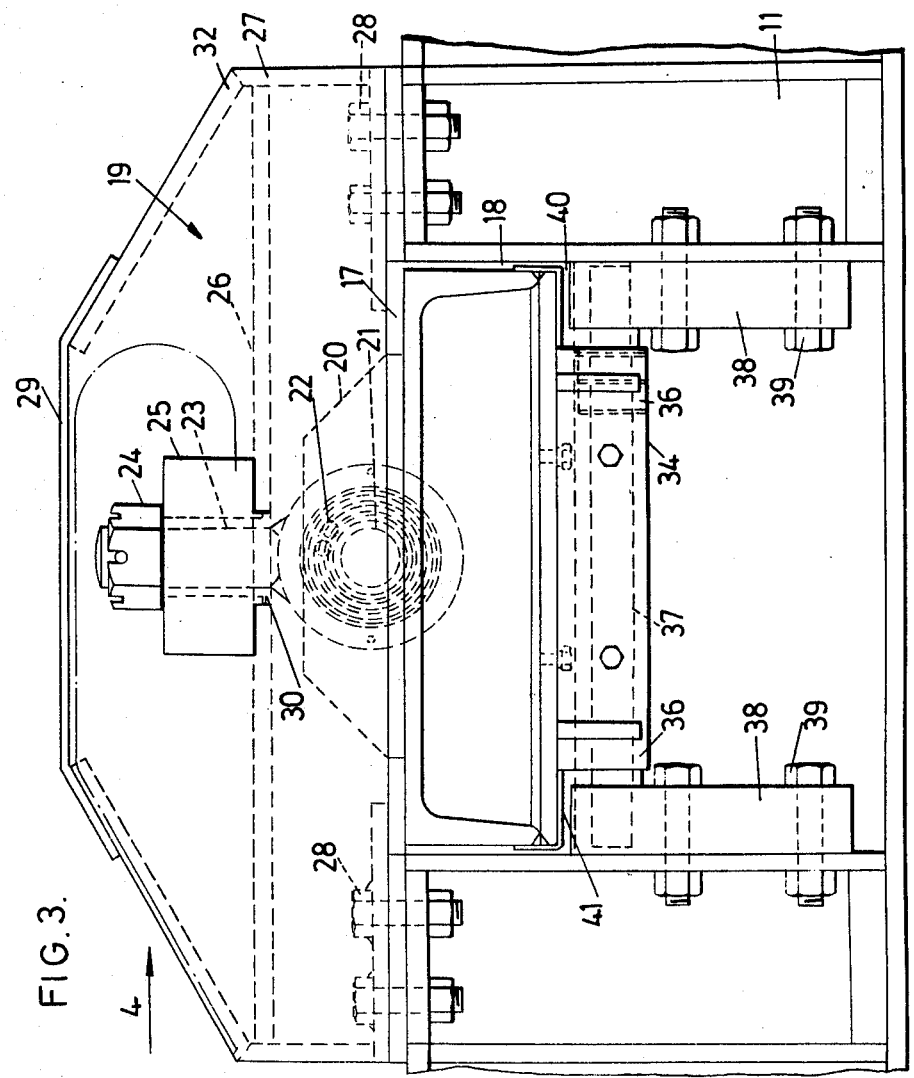

One arrangement according to the invention will now be described by way of example and with reference to the accompanying drawings, in which:

FIG. 1 and 2 are, respectively, an elevation and plan of the wheel cleaner without the weigh beam, FIG. 3 is an elevation of one end of the weigh beam and its suspension, FIG. 4 is a partial elevation seen in the direction of the arrow 4 of FIG. 3, and FIG. 5 is a block diagram of a system for processing the signals received from the weight transducers or load cells.

Referring firstly to FIGS. 1 and 2, the drawings show a wheel cleaner which is basically similar to that described in our Patent Specification No: 1270251. That is to say, it has a main frame 11 with cross rollers 10 on which the wheels of a truck can be spun to remove mud, stones etc., by centrifugal action. However, the main frame 11 of the wheel cleaner is now made longer as at 12 to accommodate a weigh beam, which is placed across the frame in the region 13 at one end thereof. This is the end first reached by a vehicle passing over the wheel cleaner, the direction of travel being indicated by the arrow 14 in FIG. 2.

Referring now to FIGS. 3 and 4, the weigh beam 17 extends transversely across the region 13 of the wheel cleaner frame 11 and is sufficiently wide for it to support truck tyres of the largest size to be accommodated without any overlap at the front or rear of the portion of the tyre in contact with the supporting surface. For most of its length the beam 17 is of deep box section and it is carried on the frame 11 with its top surface at substantially the same horizontal level as the tops of the horizontal frame members and the rollers 10. The end portions 18 of the weigh beam 17 are stepped up at their under-sides, being thus of shallower box section than the main length of the beam over which the truck wheels pass, and these portions 18 extend into recesses 16 cut in the tops of the main side longitudinals 15 of the wheel cleaner frame 11, where they are pendantly supported by suspension assemblies 19 as now described.

Secured to the top of each beam end 18 are two brackets 20 with aligned holes in which are lodged a horizontal pin 21 having its axis parallel to the direction of length of the weigh beam, that is to say at right angles to the direction of travel of trucks over the wheel cleaner/weigh beam. The centre of the pin 21 is journalled in a roller bearing assembly 22 of the type that allows limited universal movement and the outer case of this bearing assembly is welded to the lower end of a vertical bolt 23 that passes up through a vertical central hole in a load cell 25 and has a nut 24 locked on its upper end by means of which nut the due proportion of the load of the weigh beam carried by the respective end suspension is transferred to the load cell 25. The load cell itself stands on a horizontal plate 26 of a bridge member 27 that extends over the recess 16 in the longitudinal member 15 of the wheel cleaner frame 11 and is bolted to said frame at its ends, as at 28. A hole 30 in the plate 26 allows the bolt 23 to pass through.

To protect the suspension assembly and exclude dirt, the bridge member 27 has solid side and end walls 31, 32 and a sealed top cover 29. Also the weight beam 17 emerges from the suspension assembly through a sealing gaiter 33 of sponge plastics material that is proof against oil, petrol and water.

To prevent end wise movement of the weigh beam 17, each end portion 18 has welded to its underside a depending bracket 34 carrying an abutment plate assembly 35 that faces in along the weigh beam. This abutment plate assembly engages the outward surfaces of the cases of needle roller bearings 36 carried on a horizontal shaft 37 extending parallel to the direction in which trucks pass over the wheel cleaner/weigh beam. The ends of the shaft 37 are received in robust journal blocks 38 secured by bolts 39 to the wheel cleaner frame 11. The blocks 38 also act as limit stops for the weigh beam, in that after the weigh beam end 18 has descended by the amount allowed by a gap 40 its underside encounters the tops of the blocks 38. This allows the weigh beam freedom to operate the load cells and to tilt to some extent, while rendering the machine safe in the event of a suspension assembly failure. The underside of the weigh beam end is provided with a liner strip 41.

Although the invention is not limited to the use of electrical load cell transducers, electrical transducers such as strain gauges give a direct electric signal output that can be readily processed. The signal output can be used to drive dial reading instruments, for example mounted on a pillar or in a kiosk near, but preferably not close to the path of vehicles over, the wheel cleaner/weigh beam. Alternatively, or in addition, a permanent record data sheet or card print out of the information can be provided. FIG. 5 illustrates a simple system for processing the signals from the two load cells 25 at opposite ends of the weigh beam 17. The signals are summed at 42, the sum can be stored temporarily at 43, and successive signals from the several axles on the same truck are integrated at 44. The output of the store 43 can be displayed on a visual instrument 45, by connecting a switch 46 to line 47, so as to show individual axle weights; and by switching to line 48 the output of the integrator 44 can be displayed to show the total vehicle weight. An optional printer 49 for delivering a permanent record may also receive the display signals; a keyboard 50 is associated with the printer 49 so that an operator can insert into the record additional information relating to the truck being weighed.

In order for the axle weigher to operate, a truck driver moves his vehicle progressively forward to bring each axle in turn on to the weigh beam. Maximum load signal is recorded for each axle when the wheels of that axle are in the position directly over the weigh beam and entirely supported by it. Such a weigh beam with electrical transducers in the load cells will give accurate weighings without the need for the vehicle having to stop as each axle passes over the weigh beam; that is to say, the vehicle can move forward continuously at a low speed up to, for example, three miles per hour. Uneven loading across the vehicle can be accommodated by the weigh beam tilting slightly. The summed or averaged load cell signals will give the total axle weight and, if desired, individual wheel weights can be obtained by additionally processing each load cell signal separately. When weighing with the vehicle moving forward continuously, it is advantageous for the equipment to be arranged so that display of the weight and printout of the permanent record are inhibited, and a warning lamp or alarm is lit or sounded should speed of the vehicle be in excess of the maximum for which the system is designed.

In general, the electrical output of each load cell transducer will be an analogue in the form of a variable amplitude square wave, that is to say there will be one 'pulse' corresponding to the passage of each axle. This signal can be amplified, shaped and demodulated as necessary to give a D.C. analogue signal for conversion to a more readily processable digital signal by normal analogue-to-digital conversion, the number of digital pulses representing the applied load. The digital signal can then be employed to drive a digitial display and can be processed in any desired manner to give whatever permanent record is required. A filter system may be necessary to remove signal fluctuations due to vibrations from the vehicle suspension systems.

It is considered that the most usual kind of information presentation required by any building-site contractor will be a display and printout of individual axle weights for each vehicle, and a printout, possibly with a display also of the pay load carried by the vehicle, which latter can be obtained by summing or accumulating the individual axle weights and subtracting the tare weight of the vehicle. The tare weight can be set in as a constant digital number if the vehicles are all of the same type, or the tare weight can be fed in separately for each vehicle by an operator observing the passage of vehicles over the equipment. The information in the printout or permanent record for each vehicle will preferably include the vehicle registration number and the date and time. As each axle passes over the weigh beam the equipment will automatically select for display the maximum signal (after fluctuations due to suspension vibrations have been eliminated) obtained when the wheels of that axle are supported solely by the weigh beam. The display of that axle weight will then remain until the next axle is weighed. There will preferably be visual and/or audible warning if any axle is over the permitted weight, obtained simply by applying the axle weight signal to a comparison circuit receiving also a constant digital number representing the weight limit.

What we claim is:

1. In combination a wheel cleaner and axle weigher for trucks, comprising:
   - a base frame installed at ground level in position for a truck to be driven in a longitudinal direction over said frame and including longitudinally-extending structural members along its sides;
   - wheel cleaner means comprising at least one pair of longitudinally spaced rollers mounted on said base frame between said structural members for rotation about respective parallel horizontal axes, said rollers being positioned to permit truck wheels on a common truck axle to be spun thereon to throw dirt off said wheels by centrifugal action;
   - a weigh beam having bearing pins projecting at its ends;
   - support means including load cells mounted on said longitudinally-extending structural members of said base frame at only one end of said base frame at a level above the weigh beam for supporting said weigh beam pendulously at its ends in a position transversely across said base frame, said support means including bearing assemblies mounted under and carried by said load cells and receiving said bearing pins on the ends of said weigh beam, which bearing assemblies are of a type permitting a degree of universal movement so that the weigh beam can tip and tilt to a limited extent;
   - block members mounted on said base frame to limit the extent of movement of the suppored ends of said weigh beam;
   - wherein said load cells include electrical transducer means for providing direct electrical output signals representative of the load supported by said weigh beam; and
   - signal combining means responsive to the individual output signals from said load cells to provide a further signal representative of axle weight.

2. The combination according to claim 1 wherein the weigh beam is provided with abutment means to restrain movement of the beam transversely of the base frame.

3. The combination according to claim 1 further comprising signal processing means for processing further signals representing the weights of plural truck axles to provide an indication of total truck weight.

4. The combination according to claim 3 wherein electrical transducer means are strain gauges 5. The combination according to claim 3, wherein means is provided for subtracting the tare weight of the vehicle from the total weight to give the pay load.

6. The combination according to claim 5, wherein at least one of the individual axle weights and the pay load are both visually displayed and permanently recorded by a printout device.

7. The combination according to claim 5 wherein an alarm is provided which is triggered if an individual axle weight is in excess of a preset limit.

8. The combination according to claim 5 wherein an alarm is provided to warn if a vehicle passes over the weigh beam too rapidly for accurate weighing.

* * * * *